(12) United States Patent
Smith

(10) Patent No.: US 9,444,235 B1
(45) Date of Patent: Sep. 13, 2016

(54) SNAP-IN ELECTRICAL CONNECTOR WITH SPIRAL SLOT

(71) Applicant: BRIDGEPORT FITTINGS, Inc., Stratford, CT (US)

(72) Inventor: Lawrence J Smith, Stamford, CT (US)

(73) Assignee: BRIDGEPORT FITTINGS, INC., Stratford, CT (US)

( * ) Notice: Subject to any disclaimer, the term of this patent is extended or adjusted under 35 U.S.C. 154(b) by 0 days.

(21) Appl. No.: 14/879,390

(22) Filed: Oct. 9, 2015

(51) Int. Cl.
*H02G 3/06* (2006.01)
*H02G 1/14* (2006.01)

(52) U.S. Cl.
CPC .............. *H02G 3/0616* (2013.01); *H02G 1/14* (2013.01)

(58) Field of Classification Search
USPC ................................................ 174/530, 668
See application file for complete search history.

(56) References Cited

U.S. PATENT DOCUMENTS

| | | | | |
|---|---|---|---|---|
| 4,012,578 A | * | 3/1977 | Moran ................. | H02G 3/0616 174/51 |
| 6,043,432 A | * | 3/2000 | Gretz ................... | H02G 3/0691 16/2.1 |

* cited by examiner

*Primary Examiner* — Dhirubhai R Patel
(74) *Attorney, Agent, or Firm* — Billion & Armitage; John F. Klos

(57) ABSTRACT

A connector assembly including a connector body with a spring clip including a first free end for engaging a side wall of an electrical box upon installation. During insertion of the connector body the first free end engages the knock-out hole perimeter and deforms so as to permit further insertion. Once the connector body is fully inserted, the spring clip cooperates with a lug on the connector body to hold the connector assembly onto the electrical box. The connector body includes one or more spiral indentations for engaging a convolution of a metal cable. The spring clip biases the cable toward engagement with the spiral indentation to yield improved performance characteristics.

12 Claims, 11 Drawing Sheets

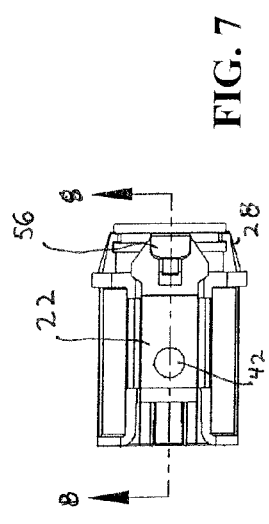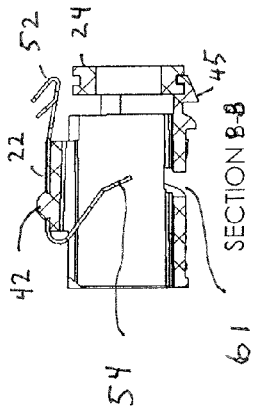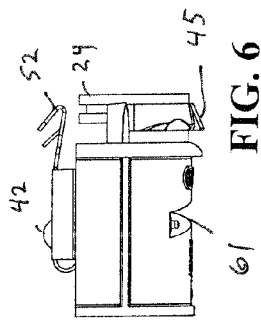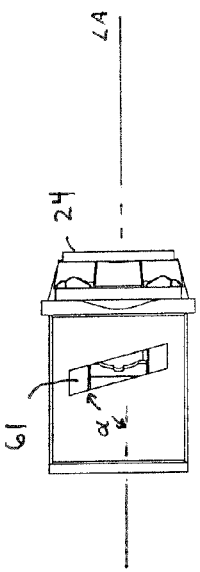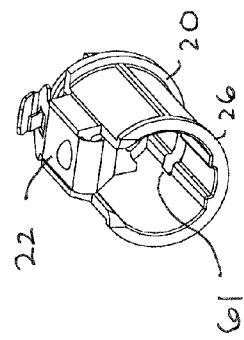
FIG. 7
FIG. 8
FIG. 6
FIG. 5
FIG. 4

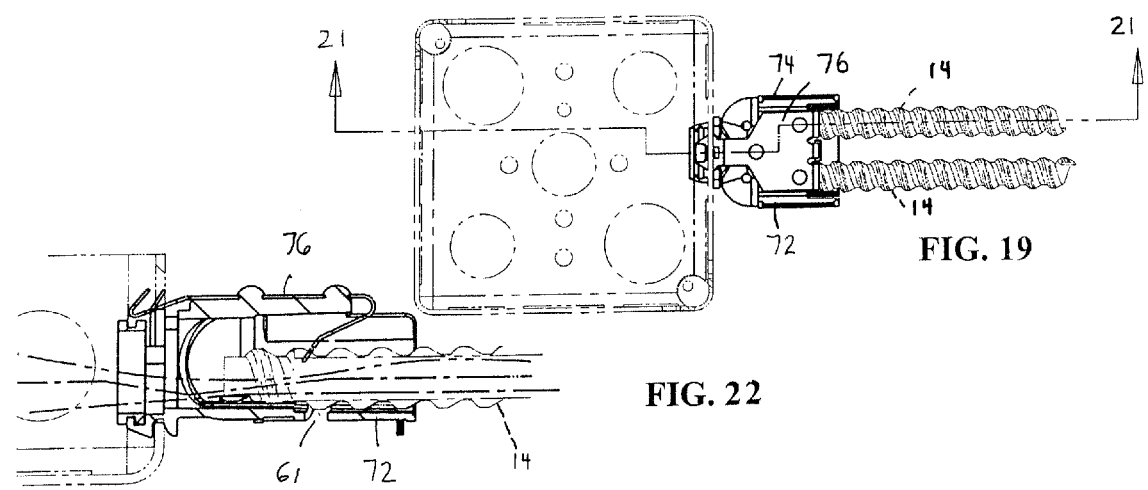
FIG. 19
FIG. 22
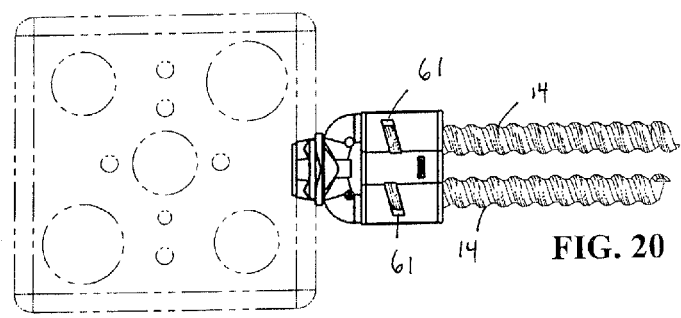
FIG. 20
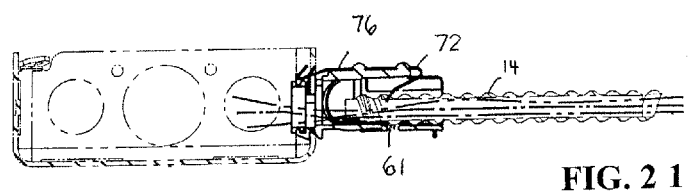
FIG. 21

SNAP-IN ELECTRICAL CONNECTOR WITH SPIRAL SLOT

TECHNICAL FIELD

The invention is directed to a further advancement in the field of electrical connector assemblies. More specifically, this application relates to a snap-fit electrical connector assembly having a construction for facilitating the connection of the connector assembly and associated cable, wire conductor and the like to an electrical box.

BACKGROUND OF THE INVENTION

Electrical connectors are commonly used for attaching electrical conductors, cables, wires, electrical metal tubing (EMT) or the like to an electric box, e.g. a junction box, outlet box, switch box, fuse box, or other similar type of electric box. Such known electrical connectors are either of a type that are secured to an electric box by a threaded lock nut or by means of a circular snap fit retaining ring of the type disclosed in U.S. Pat. Nos. 6,860,758; 6,444,907; 5,189,258; 5,266,050; and 5,171,164, for example.

So called "snap fit" connectors have been in use for some time, including connectors disclosed in Applicant's U.S. Pat. Nos. 7,064,272; 7,075,007; 7,205,489 and 7,214, 890. Such connectors have typically been coupled to the junction box by forcibly inserting one end of the connector into the knock-out hole of a junction box. Such connectors include a circular retaining ring which is deformed during insertion of the connector body into a knock-hole. In the past, a generally linear motion has been used to insert the connector end into the junction box. Using such a straight motion, the connector end is pushed into the knock out hole so as to deform a retaining ring as it passes through the knock-out hole.

The snap-fit connectors typically are constructed of several pieces including a barrel shaped body with separate sleeves or collars formed of spring steel. As the snap-type connectors are constructed of several pieces, the complexity of the connector is increased. A need exists for a simple, snap-in connector having fewer component parts. A need also exists for improved manufacturing processes to decrease fabrication time of connector assemblies.

SUMMARY OF THE INVENTION

The present invention provides a connector assembly including a connector body, a spring clip and an insulator. The spring clip is multi-purpose and functions in one embodiment to both retain the connector assembly upon an electrical box and also retain an electrical cable end received within the connector body. During insertion of the connector body a free end of the spring clip engages the knock-out hole and deforms so as to permit further insertion. Once the connector body is fully seated, the free end cooperates with a locking lug on the connector body to hold the connector assembly onto the electrical box. In a preferred embodiment, the spring clip functions to both retain the connector assembly upon an electrical box and also retain an electrical insulator at a front portion of the assembly. In another embodiment the spring clip additionally functions to retain an electrical cable received within the connector body.

The present invention is also directed to a connector body with a multi-function spring clip which cooperates with a spiral indentation defined on an interior surface of the connector body to yield improved performance characteristics. The spiral indentation may be an open spiral-shaped slot extending from an interior surface to an exterior surface of the connector body. Alternatively, the spiral indentation may be a closed slot structure, such as in the form of a spiral channel defined only in the interior of the connector body. In another embodiment, the spiral indentation may comprise multiple short linear indentations aligned in a spiral manner around the interior surface of the connector body.

The spiral indentation is preferably positioned generally opposite the spring clip so that the spring clip biases a cable, such as flexible metal clad cable, toward engagement with the spiral indentation. The spiral indentation may be defined with relatively sharp edges, for example a spiral channel with generally perpendicular walls (relative to the inner surface of the connector body). The spiral indentation is preferably aligned to correspond to the angled spiral convolutions of flexible metal clad cable, armor clad cable, or flexible metal conduit and the spring clip functions to bias the cable or conduit into engagement with the spiral indentation.

Engagement between the convolutions of the cable or conduit with the edges of the spiral indentation may yield a beneficial additional retention force as compared to a connector assembly without the spiral indentation. This additional retention force may contribute to the connector meeting or exceeding applicable UL pull-out force requirements.

The edges of the spiral indentation also provide a number of high-pressure contact points between the connector body and the armor cable, which results in a lower voltage drop (less electrical resistance) across the fitting when mated to a box. This mechanical engagement between the convolutions of the armor cable and the spiral indentation of the connector body may lower the voltage drop across the connector body and contribute to the connector meeting UL resistance drop requirements.

The present invention is also directed to a method of using a connector assembly, wherein the method includes inserting a nose end of the connector assembly into the knock-out hole with the free end of the spring clip initially deflecting from contact with a side wall of the junction box, then further inserting the connector assembly into the junction body to release the free end and lock the connector body in place. As the connector body is rotated during installation, the free end of the spring clip is initially deformed by contact with the side wall of the junction box and is then released after the spring clip end is within the junction box. When the armor cable or metal clad cable is inserted into the connector body the spiral convolutions of the cable are engaged against one or more spiral indentations in the interior of the connector body. The spring clip functions to bias the cable or conduit into engagement with the spiral indentation of the connector body.

An object of the present invention is to provide an electrical connector with a multi-function spring clip whereby the connector body is secured to an outlet box through simple insertion into an outlet box and whereby the cable convolutions are biased into engagement against a spiral indentation on the interior surface of the connector body.

Yet another object of the present invention is to provide an electrical connector with a spring clip having a first free end for cooperating with an edge of a knock-out hole of an outlet box to retain the electrical connector and a second free end for engaging an electrical wire. The spring clip generates a force tending to retain the connector body within the knock-out hole of the electrical box.

Yet another object of the present invention is the provision of a group of related electrical connectors having a unique front-end including a multi-function spring clip and retained insulator while providing a variety of back-ends adapted to a engage a variety of cable ends, including but not limited to MC (metal clad cable) or AC (armor clad cable) cables or flexible metal conduit (FMC). The flexible nature of an internal spring clip permits the connector assembly to be utilized across a range of cable diameters.

Yet another object of the present invention is the provision of a multi-function spring clip serving to limit pull-out of the electrical connector from an electrical box while retaining an electrical insulator against displacement. In some embodiments the multi-function spring clip also functions to secure electrical cable(s) within the connector and even define a cable divider for maintaining a separation between a pair of electrical cables.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 4 is another perspective view of the electrical connector assembly of FIG. 1.

FIG. 5 is a bottom plan view of the electrical connector assembly of FIG. 4.

FIG. 6 is a side elevational view of the electrical connector assembly of FIG. 4.

FIG. 7 is top plan view of the of the connector assembly of FIG. 4.

FIG. 8 is cross-sectional view of the connector assembly of FIG. 7 taken along lines 8-8.

FIG. 19 is a top plan view of the connector assembly of FIG. 14 attached to an electrical junction box.

FIG. 20 is a bottom plan view of the connector assembly of FIG. 14.

FIG. 21 is a cross-sectional view of the connector assembly of FIG. 19 taken along lines 21-21.

FIG. 22 is a detailed view of a portion of FIG. 21.

DETAILED DESCRIPTION OF THE INVENTION

Figure 1:
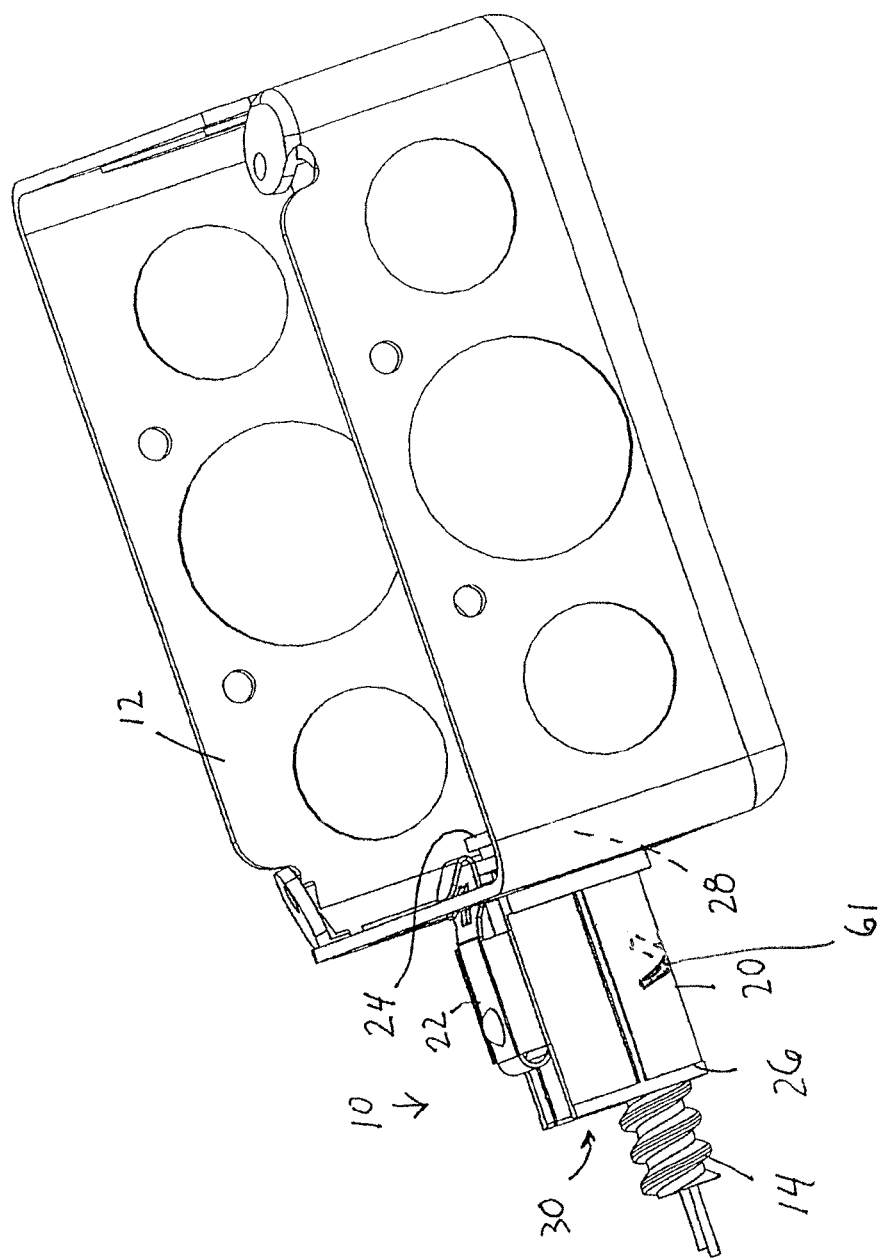
FIG. 1 is a perspective view of an electrical connector assembly in accordance with the present invention, depicted as being attached to an electrical junction box.
Figure 2:
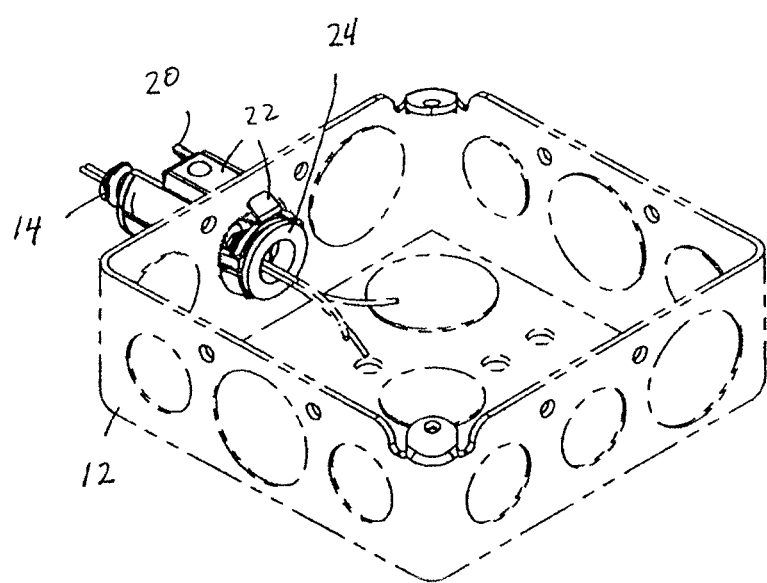
FIG. 2 is a perspective view of the electrical connector assembly of FIG. 1.

Referring to the drawings, FIGS. 1 and 2 are perspective views of the first embodiment of an electrical connector assembly 10 in accordance with the present invention. FIGS. 1 and 2 depict connector assembly 10 between junction box 12 and electrical cable 14. As described hereinafter, connector assembly 10 is used to couple electrical cable 14 at knock-out hole 16 of electrical box 12.

Connector assembly 10 includes connector body 20, spring clip 22, and insulator 24. Connector body 20 is formed with an inlet end portion 26 and an outlet end portion 28 and a bore 30 extending therethrough. As described hereinafter, connector body 20 further includes a spiral indentation 61 on an interior surface adapted to engage a spiral convolution of cable 14.

Figure 3:
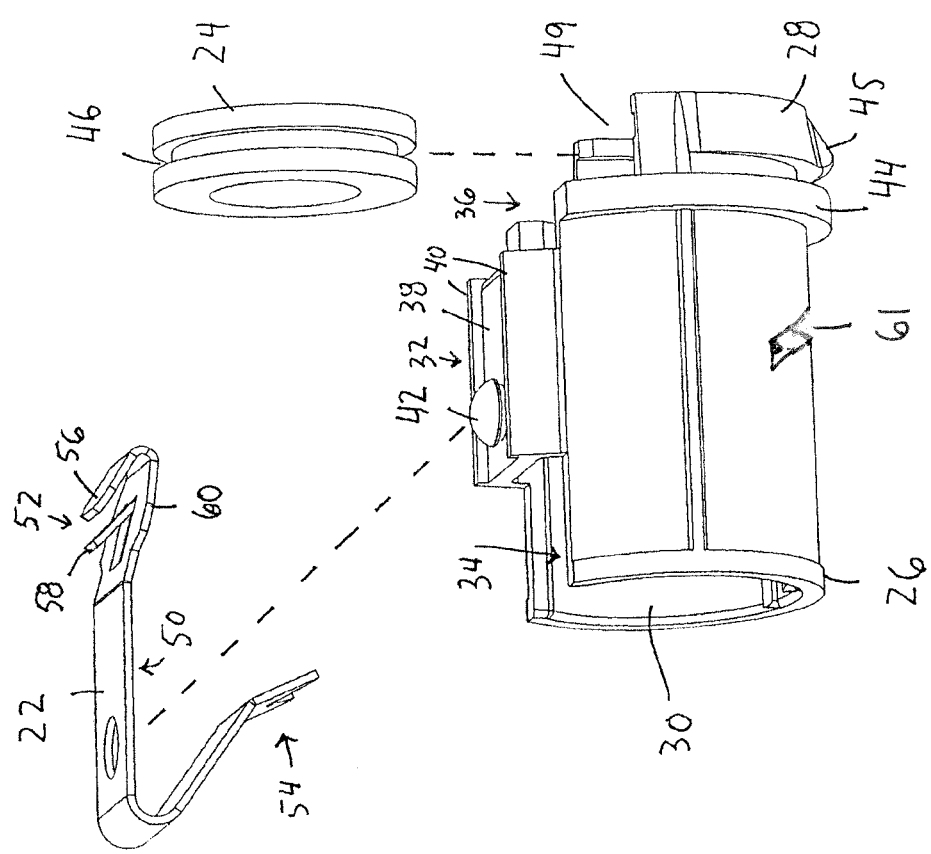
FIG. 3 is a perspective view of the electrical connector assembly of FIG. 1 in a disassembled form.

Referring to FIG. 3, connector assembly 10 is depicted in a disassembled form. Connector body 20 includes a bridge portion 32 defined between a pair of open portions 34, 36. Bridge portion 32 includes a generally planar surface 38 separating a pair of longitudinally extending walls 40. A fastener, shown as a rivet 42, secures a central portion of spring clip 22 to the planar surface 38. Walls 40 prevent spring clip 22 from rotation about rivet 42. A variety of different fasteners may be used to secure spring clip 22 to connector body 20, including but not limited to threaded fasteners, rivets, etc.

Intermediate the connector body 20, in the illustrated embodiment between the inlet end portion 26 and outlet end portion 28, there is provided radially outwardly extending flange 44 which functions as a stop to limit the degree to which connector body 20 may be inserted through the knock-out hole 16 of electrical box 12. In the illustrated embodiment, stop flange 44 is unbroken, while in alternative embodiments stop flange 44 may comprise disjointed or separated elements, such as tabs on connector body 20 together functioning to limit the degree to which connector body 20 may be inserted into the electrical box 12.

Outlet end portion 28 includes a wedge-shaped lug 45 adapted to engage a knock-out hole 16 perimeter during insertion of the connector body 20 into the knock-out hole. As described in more detail hereinafter, lug 45 is part of a positive locking mechanism by which the connector body 20 is secured to electrical box 12.

Insulator 24 is of electrically insulative material and includes an annular groove 46 adapted to engage a corresponding tongue 48 within a receptacle 49 at the outlet end portion 28 of connector body 20. In the illustrated embodiment, insulator 24 is inserted into a generally u-shaped receptacle 49 in a direction generally perpendicular to a longitudinal axis of connector body 20. Insulator 24 is prevented from substantial movement along the longitudinal axis of connector body 20 by contact between tongue 48 and groove 46. As described hereinafter, insulator 24 is held within connector body 20 by a forward free end of spring clip 22. In another embodiment, the insulator 24 may be inserted into the connector body 20 along the longitudinal axis. For example, the insulator may be pressed into an open end of the connector body.

Spring clip 22 includes a central portion 50 and a pair of free ends 52, 54. Spring free end 52 includes a hook structure including a hook end 56 and a tab 58. A pair of tapered wing portions 60 provide additional electrical continuity between spring clip 22 and the electrical box 12. Spring free end 54 defines a cable-engaging end which preferably engages the cable at the base of a convolution.

Referring to FIG. 4, connector body 20 includes spiral indentation 61 on an interior surface within bore 30. FIG. 5 is a bottom view of the connector assembly 10 showing spiral indentation 61 extending through the wall of the connector body 20.

Connector assembly 10 is especially useful for securing MC (metal clad) or armored cable 14 to a panel or electrical box. MC or armored cable 14 include a convoluted outer surface consisting of peaks and grooves such as shown in FIG. 1.

Spiral indentation 61 is positioned at an angle, a, relative to the longitudinal axis, LA, of the connector assembly 10. Angle, a, corresponds to a spiral convolution angle of cable 14 so that at least a portion of a spiral convolution of cable 14 engages with edges of spiral indentation 61. The angle, a, is approximately equal to a common armor convolution pitch (helix angle of cable) of fifteen degrees (15°). FIG. 6 is a side view of the connector assembly showing spiral indentation 61 position generally opposite the spring clip 22.

FIG. 7 is a top plan view of the connector assembly 10. FIG. 8 is a cross-sectional view of the connector assembly 10 of FIG. 7 taken along lines 8-8. In operation, and with the cable 14 inserted into the connector assembly 10, the free end 54 of spring clip 22 biases the cable 14 into engagement with the spiral indentation 61.

Figure 9:
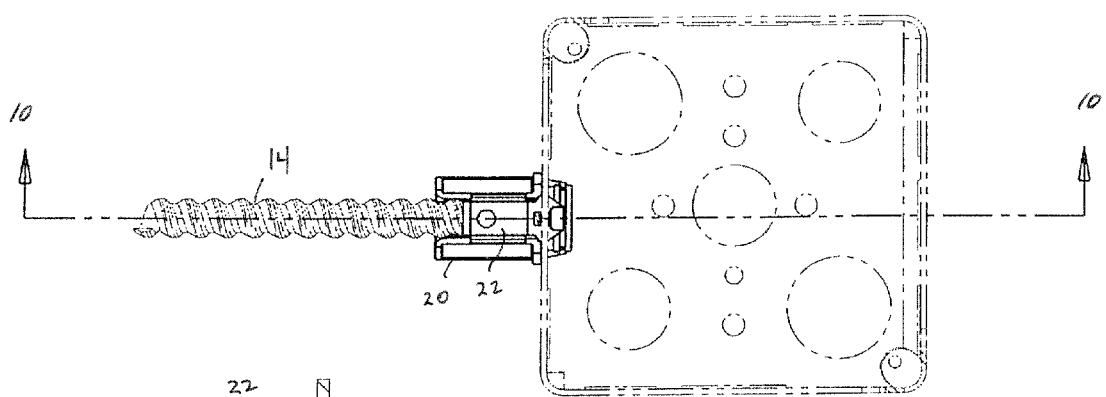
FIG. 9 is a top plan view of the connector assembly of FIG. 1 shown secured to an electrical junction box.
Figure 10:
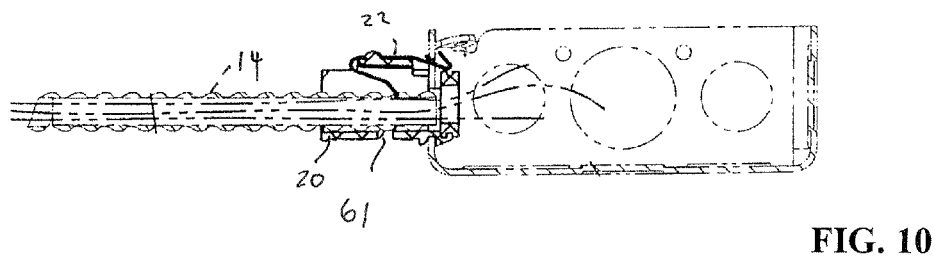
FIG. 10 is cross-sectional view of the connector assembly of FIG. 9 taken along lines 10-10.

FIG. 9 is a top plan view of the connector assembly 10 shown attached to a cable 14 and electrical box 12. FIG. 10 is a cross-sectional view of the assembly of FIG. 9 taken along lines 10-10. Cable 14 is inserted into the bore 30 of the connector body 20 and, as a result of the flexibility imparted to the free end 54 of spring clip 22 by the length and angle of the free end, is engaged by the cable-engaging end in one of the grooves of cable 14. Insertion of cable 14 into the connector body 20 is limited by the insulator 24 held at the outlet end portion 28.

Figure 11:
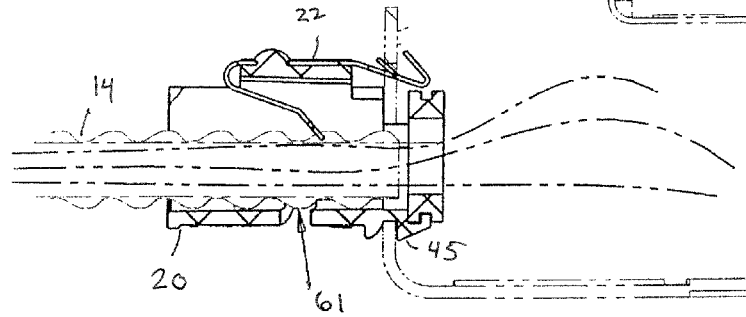
FIG. 11 is a detailed view of a portion of FIG. 10

FIG. 11 is a detailed view of a portion of FIG. 10 showing engagement between the spiral convolution of cable 14 and the spiral indentation 61 of connector body 20. Spring free end 52 extends from central portion 50, spans across open portion 36 and across a portion of insulator 24. Hook end 56 engages an inner surface of electrical box 12 and tab 58 engages an outer surface of electrical box 12. Upon insertion of the outlet end portion 28 into electrical box 12, the hook structure of spring end 52 initially deflects and then retracts to secure the connector assembly 10 to the electrical box. Spring end 54 engages cable 14, preferably within a cable groove and provides a force tending to resist withdrawal of cable 14 from connector assembly 10. Spring clip 22 can accommodate a range of MC/AC cables.

Figure 12:
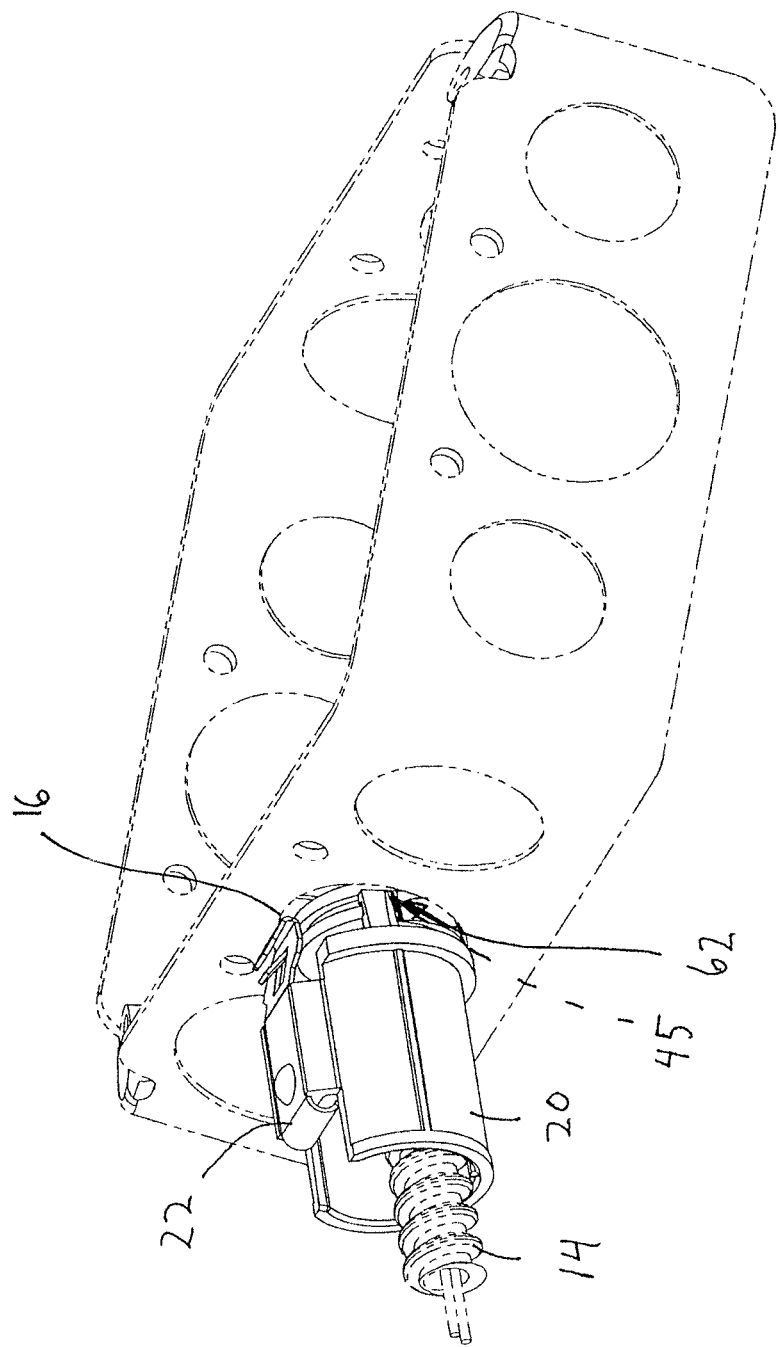
FIG. 12 depicts a method of inserting a connector assembly of FIG. 1 into an electrical junction box.
Figure 13:
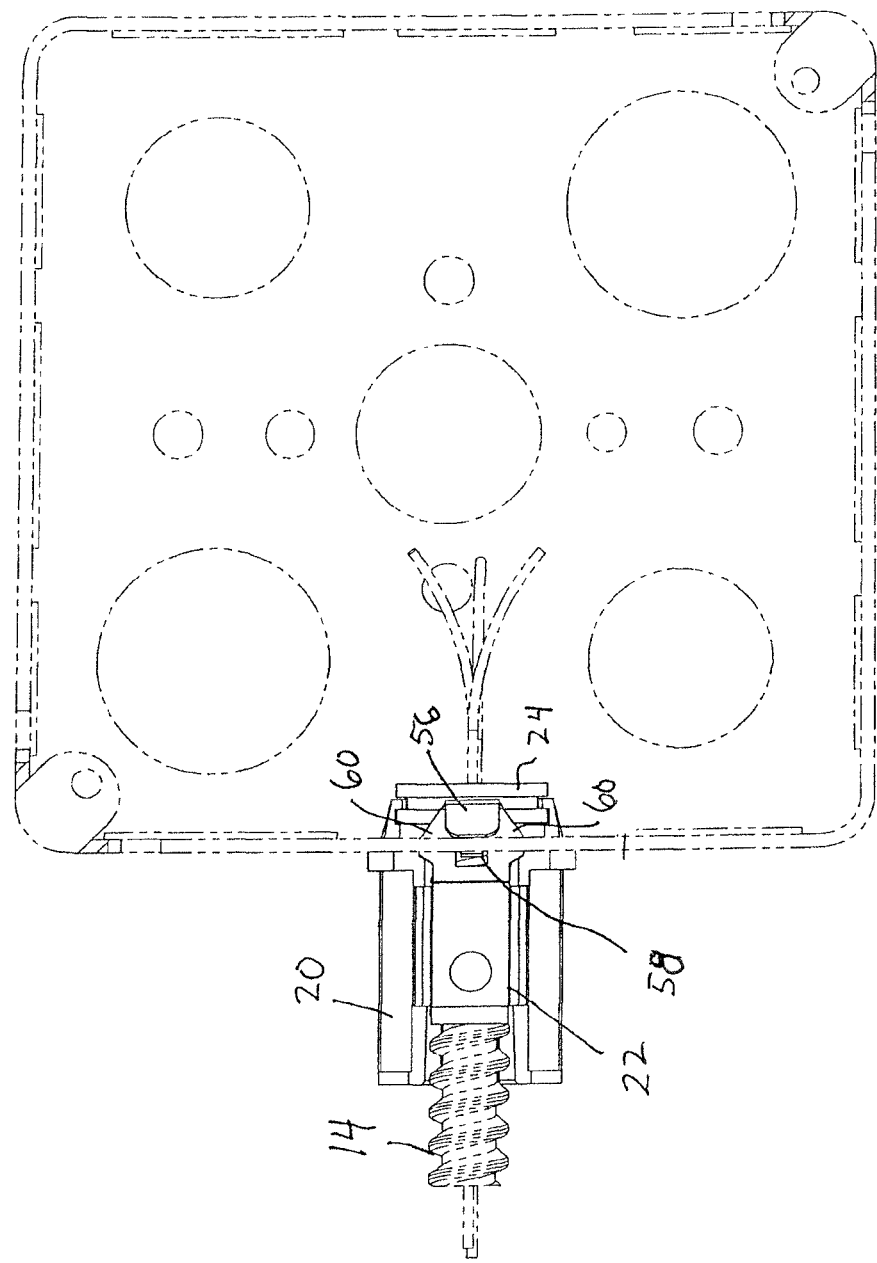
FIG. 13 is top plan view of the connector assembly of FIG. 12 as being attached to an electrical box.

FIG. 12 depicts insertion of connector assembly 10 into electrical box 12. Lug 45 is initially inserted to engage a lower edge portion of hole 16 and connector body 20 is then rotated generally about the lower edge portion. As spring end 52 engages an upper edge portion of hole 16, spring clip 22 deflects into the open portion 36 of connector body 20. Upon full insertion, as shown in FIG. 13, spring clip 22 retracts and engages inner and outer surfaces of the electrical box 12.

FIG. 12 also illustrates a tapered contact rib 62 on outlet end portion 28. Contact rib 62 functions to center connector body 20 within hole 16 during insertion. A portion of contact rib 62 is designed to be shaved away (by relatively sharp edges of hole 16) as the outlet end portion 28 of connector body 20 is inserted into hole 16. In additional to this alignment feature, contact rib 62 increases electrical conductivity between connector body 20 and electrical box 12.

Figure 14:
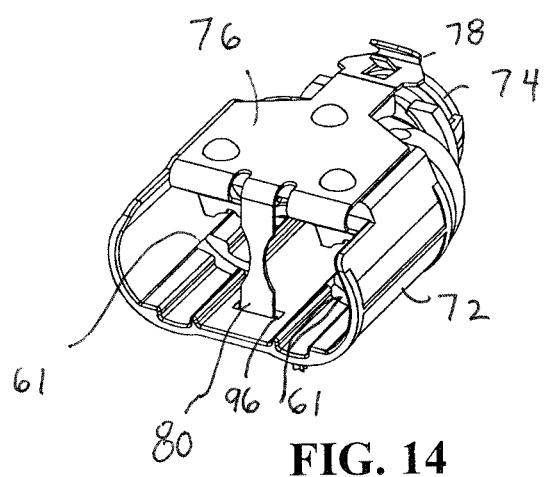
FIG. 14 is a perspective view of a second embodiment of an electrical connector assembly of the present invention.

FIG. 14 is a duplex version of connector assembly 70 for securing a pair of electrical cables 14 to an electrical box 12. Connector assembly 70 includes connector body 72, insulator 74, and duplex spring clip 76. Similar to single cable spring clip 22, duplex spring clip 76 engages an electrical box 12 at one end 78 and engages a pair of cables 14 at its other ends. A cable divider 80 is defined by a portion of spring clip 76 and functions to maintain separation between the pair of cables 14. A pair of cable-engaging spiral indentations 61 is provided in the connector body 72.

Figure 15:
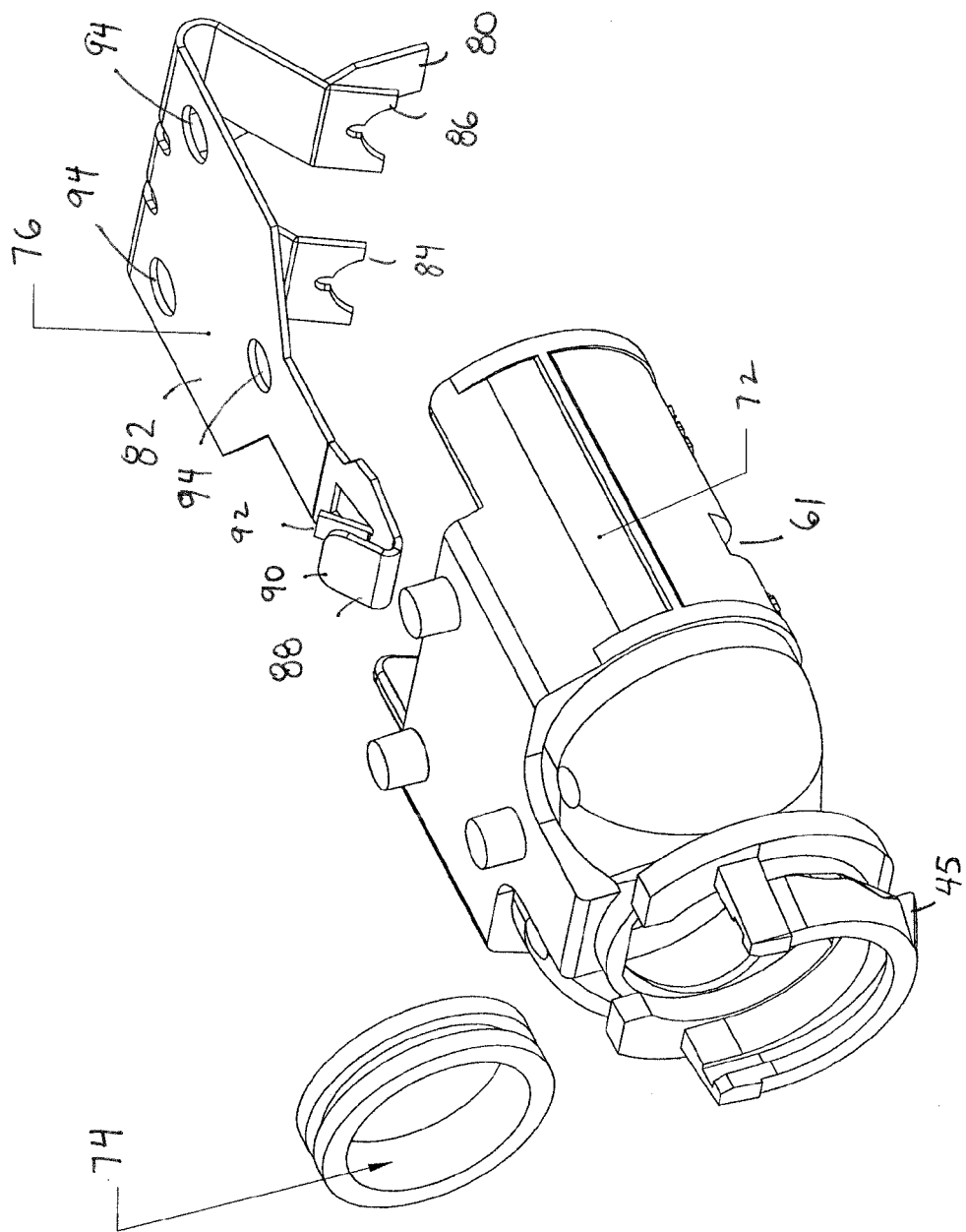
FIG. 15 is a perspective view of the connector assembly of FIG. 14.

FIG. 15 is an exploded perspective view of the connector assembly 70 of FIG. 14. Spring clip 76 includes a central portion 82 separating the free spring ends 84, 86 from spring end 88. Spring clip 76 includes spring end 88 having a hook structure including a hook end 90 and a tab 92. Cable engaging ends 84, 86 are adapted to engage cables 14. A plurality of apertures 94 are formed in the central portion 82 of spring clip 76 through which a plurality of fasteners pass to secure spring clip 76 to connector body 72.

Figure 16:
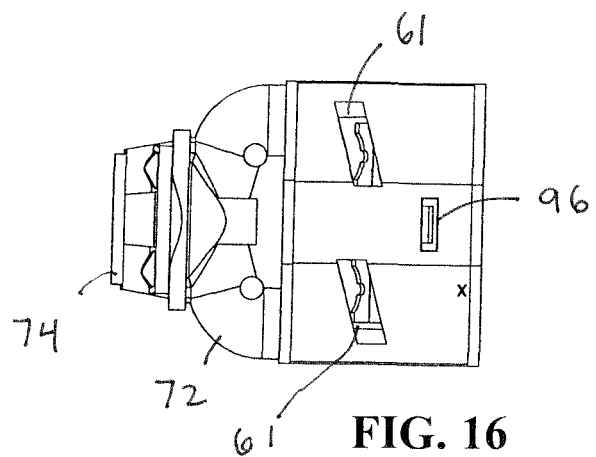
FIG. 16 is a bottom view of the connector assembly of FIG. 14.

As shown in FIGS. 14 and 16, connector body 72 further includes a cavity 96 for engagement with an end of cable divider 80. Fasteners, shown as a rivets, secure a central portion of spring clip 76 to the planar mount surface of connector body 72. A variety of different fasteners may be used to secure spring clip 76 to connector body 70, including but not limited to threaded fasteners, other rivets, etc.

FIG. 16 also shows the pair of spiral indentations 61 as being generally parallel and preferably aligned relative to the spiral convolutions on a cable 14 as shown in FIG. 20.

Figure 17:
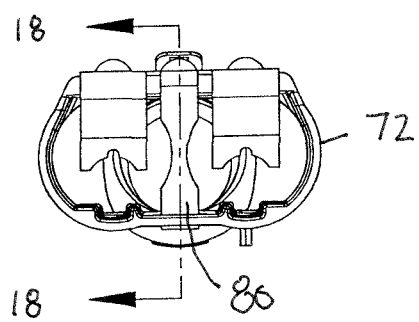
FIG. 17 is a side view of the connector assembly of FIG. 14.

FIG. 17 is an elevational view of the connector assembly of FIG. 14.

Figure 18:
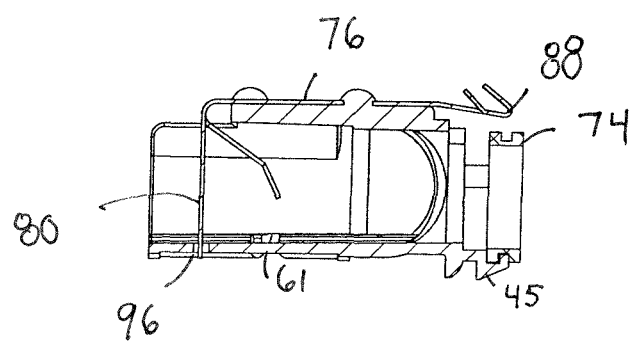
FIG. 18 is a cross-sectional view of the connector assembly of FIG. 17 taken along lines 18-18.

FIG. 18 is a cross-sectional view of the connector assembly taken along lines 18-18 in FIG. 17. As shown, the free ends of spring clip 76 are generally aligned above the spiral indentations 61 and the free end of cable divider 80 is received into cavity 96.

FIG. 19 is a top plan view of the connector assembly 70 shown as attached to electrical box 12. FIG. 20 is a bottom plan view of the connector assembly of FIG. 19. FIG. 21 is a cross-sectional view of connector assembly 70 taken along lines 21-21 in FIG. 19.

FIG. 22 is a detailed view of a portion of FIG. 21. The width of spiral indentation 61 is approximately the same as the peak-to-peak spacing of the spiral convolutions on cable 14. In other words, only a portion of one spiral convolution engages spiral indentation 61.

Embodiments of connector assemblies of the present invention are designed to secure MC (metal clad cable) or AC (armor clad cable) cables or ⅜" flexible metal conduit (FMC) to an electrical box or enclosure. The connectors may accept multiple versions of these cables, for example 14/2 or 10/3, which may vary in outer diameter from 0.420" to 0.600". The flexible nature of the spring clip and internal guide ribs permit the connector assembly to be utilized across a range of cable diameters. In other embodiments of the present invention, other cable types and size may be utilized.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. An electrical connector assembly for securing a flexible metal clad electrical cable to an electrical box comprising:
   a connector body having an inlet end portion and an outlet end portion and a bore therebetween;
   an insulator retained at the outlet end portion of said connector body; and
   a spring clip of spring steel secured by a fastener to a surface of said connector body, said spring clip defining a pair of free ends, with a first spring end extending away from the fastener toward the insulator, and with said first spring end engaging an inner surface of the electrical box to retain the connector body to the electrical box, and with a second spring end extending into the connector body at the inlet end portion with said second spring end retaining the cable within the connector body and biasing a spiral convolution portion of the metal clad cable into engagement against a spiral indentation of an interior surface of the connector body.

2. The connector assembly of claim 1 wherein the insulator defines a cable stop which limits further movement of the cable within the connector body.

3. The connector assembly of claim 1 wherein the insulator is received within a receptacle at the outlet end portion of the connector body.

4. The connector assembly of claim 3 wherein the receptacle is generally U-shaped and includes an annular tongue portion for engaging a corresponding annular groove in the insulator.

5. The connector assembly of claim 3 wherein the spring clip extends beyond at least a portion of the insulator, said spring clip retaining the insulator within the receptacle.

6. The connector assembly of claim 3 wherein the first end of the spring clip includes a hook structure for engaging an inner surface of the electrical box.

7. The connector assembly of claim 6 wherein the first end also engages the outer surface of the electrical box.

8. The connector assembly of claim 7 wherein the hook structure includes a hook end of the spring and a tab positioned away from said hook end, with said hook end engaging the inner surface of the electrical box and with said tab engaging the outer surface of the electrical box.

9. The connector assembly of claim 1 wherein the spiral indentation is a closed channel defined in the interior surface of the connector body.

10. The connector assembly of claim 1 wherein the spiral indentation is an open spiral aperture in a wall of the connector body.

11. The connector assembly of claim 1 wherein the spiral indentation is angled relative to a longitudinal axis so as to correspond to a pitch angle of a cable convolution.

12. A method of securing a flexible metal clad cable to an electrical box using a connector assembly comprising:
   providing a connector assembly having a connector body having an inlet end portion and an outlet end portion and a bore therebetween, a insulator retained at the outlet end portion of the connector body, and a spring clip of spring steel secured by a fastener to a surface of said connector body, said spring clip defining a pair of free ends, with a first spring end extending away from the fastener toward the insulator, and with said first spring end engaging an inner surface of the electrical box to retain the connector body to the electrical box, and with a second spring end extending into the connector body at the inlet end portion with said second spring end retaining the cable within the connector body and biasing a spiral convolution portion of the metal clad cable into engagement against a spiral indentation of an interior surface of the connector body;
   inserting an outlet end portion of the connector assembly into a knock-out hole of the electrical box until a perimeter edge of the knock-out hole engages a lug;
   further inserting the outlet end portion into the knock-out hole whereby the first free end of the spring clip further deforms into the open portion; and
   yet further inserting the outlet end portion into the knock-out hole to lock the connector body into the knock-out hole, with at least a portion of the first free end of the spring clip engaging an inner surface of the electrical box.

* * * * *